US012134168B2

(12) United States Patent
Zufelt

(10) Patent No.: US 12,134,168 B2
(45) Date of Patent: Nov. 5, 2024

(54) VALVE SEAT REMOVAL IMPACT DRIVER ATTACHMENT DEVICE

(71) Applicant: Zachary Zufelt, West Townsend, MA (US)

(72) Inventor: Zachary Zufelt, West Townsend, MA (US)

(*) Notice: Subject to any disclaimer, the term of this patent is extended or adjusted under 35 U.S.C. 154(b) by 134 days.

(21) Appl. No.: 17/945,449

(22) Filed: Sep. 15, 2022

(65) Prior Publication Data

US 2023/0018596 A1 Jan. 19, 2023

Related U.S. Application Data

(63) Continuation-in-part of application No. 17/537,643, filed on Nov. 30, 2021, now Pat. No. 11,813,724.

(60) Provisional application No. 63/120,268, filed on Dec. 2, 2020.

(51) Int. Cl.
*B25B 21/00* (2006.01)
*B25B 21/02* (2006.01)

(52) U.S. Cl.
CPC ............ *B25B 21/002* (2013.01); *B25B 21/02* (2013.01)

(58) Field of Classification Search
CPC ..... B25B 21/026; B25B 21/002; B25B 27/24; B25B 21/02
See application file for complete search history.

(56) References Cited

U.S. PATENT DOCUMENTS

| | | | | |
|---|---|---|---|---|
| 5,943,924 | A * | 8/1999 | Jarvis | B25G 1/043 81/185 |
| 7,114,418 | B1 * | 10/2006 | Allen | B25B 13/48 81/439 |
| 8,733,216 | B1 * | 5/2014 | Cantlon | B25B 23/12 81/439 |
| 10,882,165 | B2 * | 1/2021 | Van Essen | B25B 21/00 |
| 2012/0204391 | A1 * | 8/2012 | Lamura | B25B 13/50 29/221.6 |
| 2017/0074308 | A1 * | 3/2017 | Tseng | B25B 23/0035 |

* cited by examiner

*Primary Examiner* — Andrew M Tecco
*Assistant Examiner* — Nicholas E Igbokwe
(74) *Attorney, Agent, or Firm* — Brennan, Manna & Diamond, LLC

(57) ABSTRACT

The present invention relates generally to the field of accessories for use with impact drivers that are useful for removing a valve seat from a fitting. The device has a first end, a second end and a central body portion. The first end has a shaft that allows the device to be attached to the chuck of an impact driver or drill. The second end has a head that can be placed within a valve seat. Once inserted into the valve seat, the impact driver or drill can be used to spin the device to remove the valve seat from the surrounding fixture.

18 Claims, 4 Drawing Sheets

VALVE SEAT REMOVAL IMPACT DRIVER ATTACHMENT DEVICE

CROSS-REFERENCE TO RELATED APPLICATION

The present application is a continuation in part application of, and claims priority to and the benefit of, U.S. patent application Ser. No. 17/537,643, which was filed on Nov. 30, 2021, and claims priority to, and the benefit of, U.S. Provisional Application No. 63/120,268, which was filed on Dec. 2, 2020, and is incorporated herein by reference in its entirety.

FIELD OF THE INVENTION

The present invention relates generally to the field of accessories for power tools. More specifically, the present invention relates to a valve seat removal attachment for an impact driver tool. The device is primarily comprised of a first end, a second end and a central body portion. The first end has a shaft that allows the device to be attached to the chuck of an impact driver or drill. The second end includes a head that can be placed within a valve seat. Once inserted into the valve seat, the impact driver or drill can be used to spin the valve seat to unscrew or remove the valve seat from the surrounding structure or fitting. The body of the accessory may further include at least one LED to illuminate the valve seat and around the working area. Accordingly, the present disclosure makes specific reference thereto. Nonetheless, it is to be appreciated that aspects of the present invention are also equally applicable to other like applications, devices, and methods of manufacture.

BACKGROUND

Faucets, shower handles, bathtub handles, and other plumbing fittings known in the art typically contain a compression valve with a stem that rotates when the handle is turned. When the handle is turned, a washer that is typically attached to the end of the stem will compress against a valve seat inside the body of the faucet, handle or other fitting, therefore effectively shutting off the water supply to the shower head, faucet, spout, spigot or the like. After prolonged periods of use, a valve seat can become worn. As a result, the water supply cannot be turned off completely or changed using the handle or knob, which is extremely undesirable.

Accordingly, the valve seat must periodically be serviced or replaced in order to restore full function to the fixture. However, removing a valve seat can be incredibly difficult and time-consuming, even for professionals. A large amount of force and leverage is often required to break a valve seat free from the fitting by using a valve seat wrench or other appropriate tool. Due to the amount of force required, brass valve seats may become easily stripped and thus require complete replacement, which is undesirable for the end user as well as the installer. Further, as a large amount of force is required, piping behind the valve seat may burst or snap off other piping, which further requires replacement. In addition, valve seats in a shower and/or bathtub may be located behind drywall in a dimly lit area. As a result, additional light is needed to adequately view the working area near the valve seat. However, an individual may need two hands to exert enough force on a valve seat wrench, and thus cannot illuminate the area as they lack an additional hand to hold a light source or to provide other illumination in the work area.

Therefore, there exists a long-felt need in the art for a device that allows a user to easily remove a valve seat from a plumbing fixture. There also exists a long-felt need in the art for a device that allows a user to easily remove a valve seat without requiring a substantial amount of force to remove and/or repair the valve seat or which causes unintended damage to other pipes or fixtures related to the valve being repaired. Further, there exists a long-felt need in the art for a device that allows a user to easily remove/repair a valve seat without requiring a substantial amount of force and also illuminates the area in and around the valve seat.

The subject matter disclosed and claimed herein, in one embodiment thereof, comprises a valve seat removal accessory for an impact driver. The invention has a first end, a second end and a central body portion. The first end includes a connection to a shaft that allows the device to be attached to the chuck of an impact driver or drill. The second end has a head that can be placed within a valve seat to securely hold the valve seat in place. Once inserted into the valve seat, the impact driver or drill can be used to spin the device to unscrew or remove the valve seat from the surrounding structure. The body of the device may further include at least one LED to illuminate the valve seat and/or the working area and a gauge to determine the insertion depth of the accessory within the valve seat.

In this manner, the valve seat removal impact driver attachment of the present invention accomplishes all of the foregoing objectives and provides a device that allows a user to easily remove a valve seat without causing damage to the other fittings connected to the valve seat. Further, the device does not require a substantial amount of force to remove and/or repair the valve seat. In addition, the device also illuminates the area in and around the valve seat during the removal or repair process. In this manner, the valve seat removal impact driver attachment device overcomes the limitations of existing methods of removing valve seats known in the art, such as using a valve seat wrench.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a valve seat removal attachment for an impact driver tool. The device has a first end, a second end and a central body portion. The device and all components are preferably manufactured from a durable metal such as, but not limited to, stainless steel, aluminum, brass, copper, metal alloys and other suitable combinations. The first end of the body has a shaft that is preferably fixedly attached to the body. However, in a differing embodiment, the shaft may be received in an opening at the first end of the body, such that the shaft is further received within an internal cavity within the central body portion. The first end, second end and center body portion may be magnetic such that an embodiment of the device with a removable shaft allows the shaft to magnetically attach to the interior cavity.

The shaft also includes a head that can be received by the chuck of an impact driver or drill.

The second end of the body has a male head that is shaped such that it can be inserted into any correspondingly threaded valve seat. In the preferred embodiment, the shape of the head directly corresponds to the shape of the configuration of the valve seat valve. However, the head shape may differ in size and shape to accommodate a wide variety of valve seat shapes, sizes, and types. The head may also be shaped like conventional shapes such as, but not limited to, a hex socket, an impact socket, a square socket, a double square socket, a penta socket, a spine socket, a Phillips socket, a slotted socket, or any suitable modification thereof that can all be received by a valve seat with a corresponding socket of the same shape.

The center body portion may further have at least one LED located on the outer surface that allows the second end to be illuminated, such that a user can better observe the valve seat while working with the device of the present invention. The LED is further powered by a battery that may be rechargeable or disposable. In a rechargeable embodiment, the battery can be recharged via a USB port. The attachment device of the present invention may further include a gauge to aid in the insertion depth of the accessory into the valve seat.

To use the device, a user loosens the chuck of the impact driver or drill, and then places the shaft into the chuck. Once the chuck is tightened around the shaft, a user can then place the head into a valve seat and power the impact driver to spin or turn the head using the device. This in turn, unthreads the valve seat from a valve housing. As a result, a user can easily remove the valve seat without significant physical exertion, effort or damage to the surrounding fittings or pipes.

Accordingly, the valve seat removal accessory for an impact driver of the present invention is particularly advantageous as it allows a user to easily remove a valve seat without requiring a substantial amount of force to remove and/or repair the valve seat. Further, the device also illuminates the area in and around the valve seat during the removal or repair process. In this manner, the valve seat removal accessory for use with an impact driver overcomes the limitations of existing methods of removing valve seats known in the art, such as by using a valve seat wrench or other similar tool.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
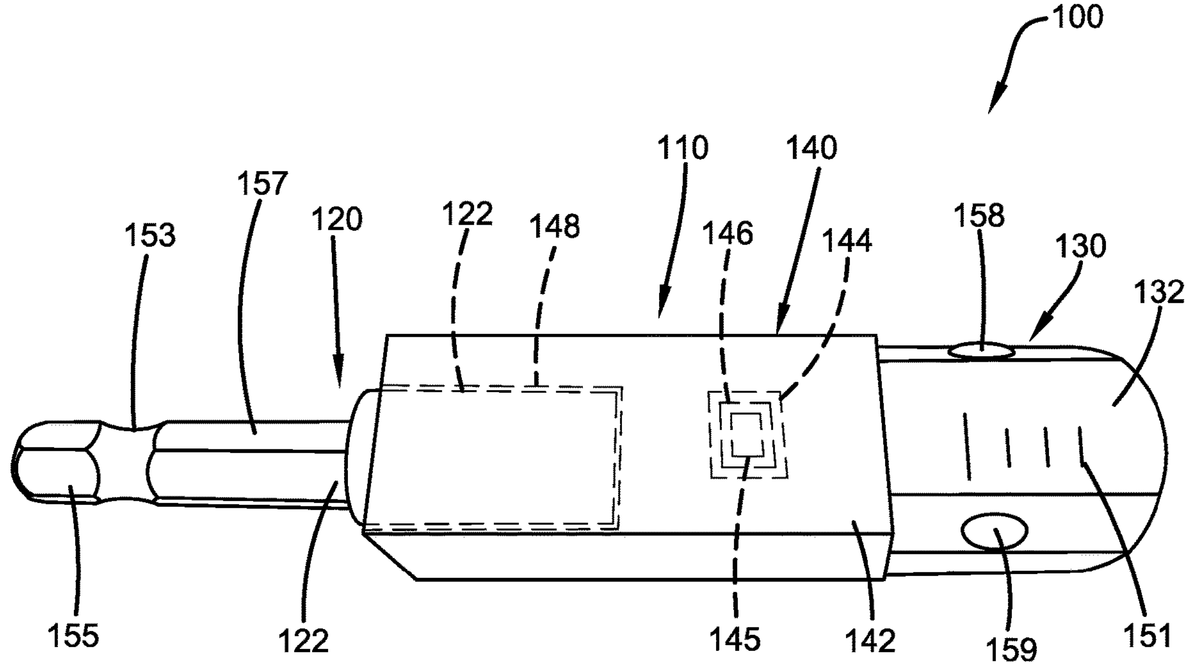
FIG. 1 illustrates a perspective view of one potential embodiment of an attachment or accessory to use for valve seat removal with an impact driver of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that allows a user to easily remove a valve seat from the surrounding fittings. There also exists a long-felt need in the art for a device that allows a user to easily remove a valve seat without requiring a substantial amount of force to remove and/or repair the valve seat, and without causing damage to the surrounding fittings. Further, there exists a long-felt need in the art for a device that allows a user to easily remove a valve seat without requiring a substantial amount of force to remove and/or repair the valve seat that also illuminates the area in and around the valve seat during the repair/removal process.

The present invention, in one exemplary embodiment, is comprised of an accessory for removing a valve seat with an impact driver and includes a first end, a second end and a central body portion. The device and all components are preferably manufactured from a durable metal such as, but not limited to, stainless steel, aluminum, brass, copper, metal alloys and other suitable materials. The first end of the body has a shaft that is preferably fixedly attached to the body, but in differing embodiments the shaft may be received in an opening at the first end of the body. In this particular embodiment, the shaft is further positioned in an internal cavity within the central body portion. The first end, second end and center body portion may be magnetic, such that an embodiment of the device with a removable shaft allows the shaft to magnetically attach to and be held in the interior cavity. In addition, the shaft is comprised of a head that can be received by a chuck of an impact driver or drill.

The second end of the body has a head that is shaped such that it can be inserted into the opening of any suitable valve seat known in the art, such that the shape of the head directly corresponds to the shape of the valve seat valve to provide a locking engagement. However, the head shape may differ in size and shape to accommodate a wide variety of valve seat shapes, sizes, and types in differing embodiments. The head may also be shaped as conventional geometric shapes such as, but not limited to, a hex socket, an impact socket, a square socket, a double square socket, a penta socket, a spine socket, a Phillips socket, a slotted socket, etc., that can be received by a valve seat with an opening of the same shape.

Further, the center body portion may further have at least one LED located on the outer surface that illuminates the second end, such that a user can better observe the valve seat during use of the impact driver with the attachment connected to the driver or drill. The LED is further powered by a battery that may be rechargeable or disposable. In a rechargeable embodiment, the battery can be recharged via a USB port. A guide may be provided on the side of the attachment or accessory so that the user can determine a suitable depth to insert the attachment.

To use the device, a user loosens the chuck of the impact driver or drill and then places the shaft into the chuck. Once the chuck is tightened around the shaft, a user can then place the head into a valve seat and power the impact driver to spin or turn the head to unthread a valve seat from a valve housing or fitting. As a result, a user can easily remove the valve seat without significant physical exertion and effort.

Accordingly, the valve seat removal tool for use with an impact driver of the present invention is particularly advantageous as it allows a user to easily remove a valve seat without requiring a substantial amount of force to remove and/or repair the valve seat. Further, the device also illuminates the area in and around the valve seat during the removal or repair process. In doing so, the valve seat removal impact driver attachment device overcomes the limitations of existing methods of removing valve seats known in the art, such as using a valve seat wrench or other similar tool.

Referring initially to the drawings, FIG. 1 illustrates a perspective view of one potential embodiment of a valve seat removal tool or accessory for use with an impact driver or drill 100 of the present invention in accordance with the disclosed specification. The device 100 is comprised of a body 110 that has a first end 120, a second end 130, and a central body portion 140. The device 100 and all components are preferably manufactured from a durable metal such as, but not limited to, stainless steel, aluminum, brass, copper, alloys and other suitable materials. The body 110 or portions of the body 110 may be magnetic or non-magnetic. The second end 130 may have a gauge 151 so that the user may be able to determine the depth of insertion of the end into the valve seat. The first end 120 has a hex-shaped engagement end 153 which is separated by a recessed area 155 from the remainder of the first end or body 157 of the first end. The first end 120 body portion 157 is insertable within the cavity 148. The second end 130 may also have deformable elements 158 and 159 which are used to aid in the securement of the second end 130 within the valve seat. The deformable element helps lock the second end in position and limit the potential rotational torque from slipping when in the valve seat. The first end 120 has a diameter that is less than the diameter of the second end 130, wherein the diameter of the first end is less than half the diameter of the second end, and more preferably the diameter of the first end is about one-third the diameter of the second end.

Figure 2:
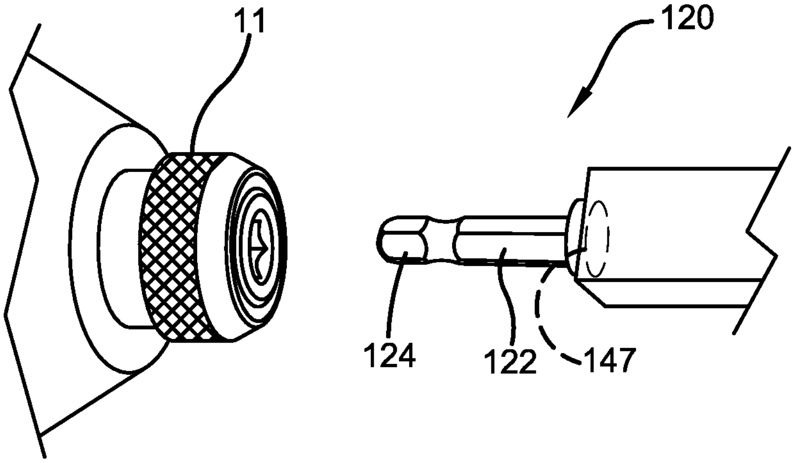
FIG. 2 illustrates an enhanced perspective view of one potential embodiment of an accessory or attachment for use in removing a valve seat with an impact driver of the present invention in accordance with the disclosed architecture.
Figure 4:
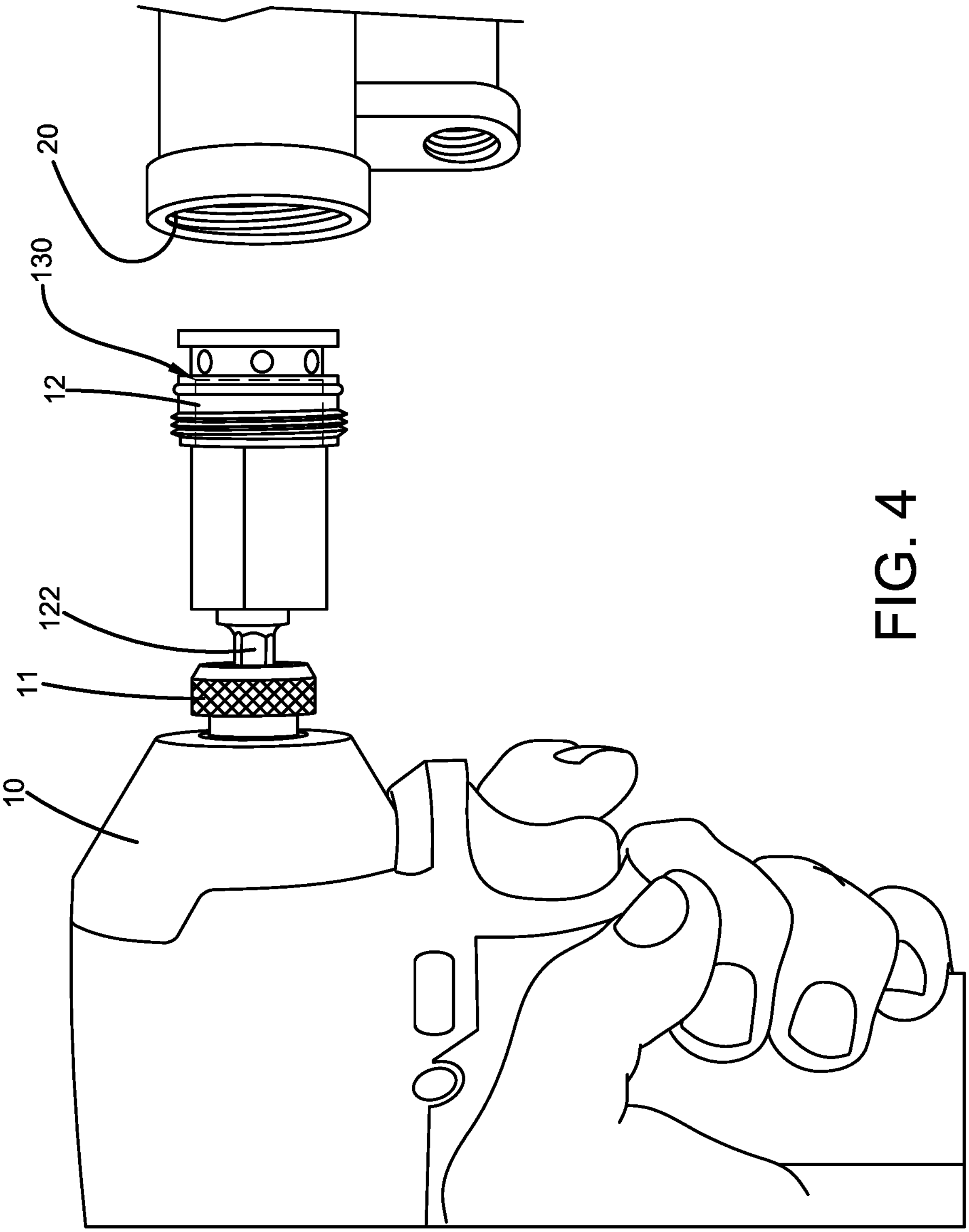
FIG. 4 illustrates a perspective view of one potential embodiment of an accessory or attachment for use in removing a valve seat with an impact driver while attached to an impact drill of the present invention in accordance with the disclosed architecture.

FIG. 2 illustrates an enhanced perspective view of one potential embodiment of a tool or attachment 100 for use in removing a valve seat with an impact driver or drill of the present invention in accordance with the disclosed architecture. The first end 120 of the body 110 is comprised of a shaft 122. In one embodiment, the shaft 122 may be fixedly attached to the body 110. However, in a differing embodiment, the shaft 122 may be received in an opening 147 at the first end 120 of the body 110, and the shaft is further received within an internal cavity 148 of the central body portion 140. It is further contemplated that the first end 120, second end 130 and center body portion 140 could be magnetic to allow the shaft 122 to magnetically attach to the interior cavity 148 contained within the shaft 122. The shaft 122 also includes a circular or polygonal head 124 that can be received by an impact driver 10 and/or drill (shown as prior art), as seen in FIG. 4. In this manner, the device 100 can be easily attached or detached to a standard impact driver 10 and/or drill without requiring further modification or other components for the drill or driver.

Figure 3:
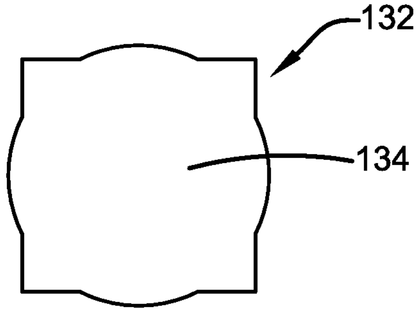
FIG. 3 illustrates a front view of one potential embodiment of an accessory or attachment for use in removing a valve seat with an impact driver attachment device of the present invention in accordance with the disclosed architecture.

FIG. 3 illustrates a front view of one potential embodiment of a valve seat removal impact driver attachment 100 of the present invention in accordance with the disclosed architecture. The second end 130 of the body 110 has a head 132. In the preferred embodiment, the head 132 is shaped such that it can be inserted into any suitable opening of a valve seat 12 known in the art, and the head 132 shape directly corresponds to the shape of the valve seat 12, as shown in FIG. 3. However, in differing embodiments, the overall shape of the head 124 may differ in size and shape to accommodate a wide variety of valve seat 12 shapes, sizes, and types. In addition, the head 132 may be shaped in conventional geometric shapes such as, but not limited to, a hex socket, an impact socket, a square socket, a double square socket, a penta socket, a spine socket, a Phillips socket, a slotted socket, etc., that can be received by a valve seat 12 with an opening of the same or corresponding shape.

In one embodiment, the head 132 may be in the form of a bit designed to extract various parts of a tub shower valve, faucet, etc. The head 132 may be in the form of an Allen wrench of any size and/or a screw extractor of any size. Other heads 132 may have architecture to allow easy removal of diverters, integral stops, volume retainers, hot seats, cold seats, etc. Any embodiment of the head 132 may be designed to remove a threaded or recessed item on a tub shower valve, a faucet, or in any other industry such as but not limited to automotive, marine, mechanical, military, or other use case involving applications of the same type of removal method needed for a tub shower valve or a faucet.

Figure 5:
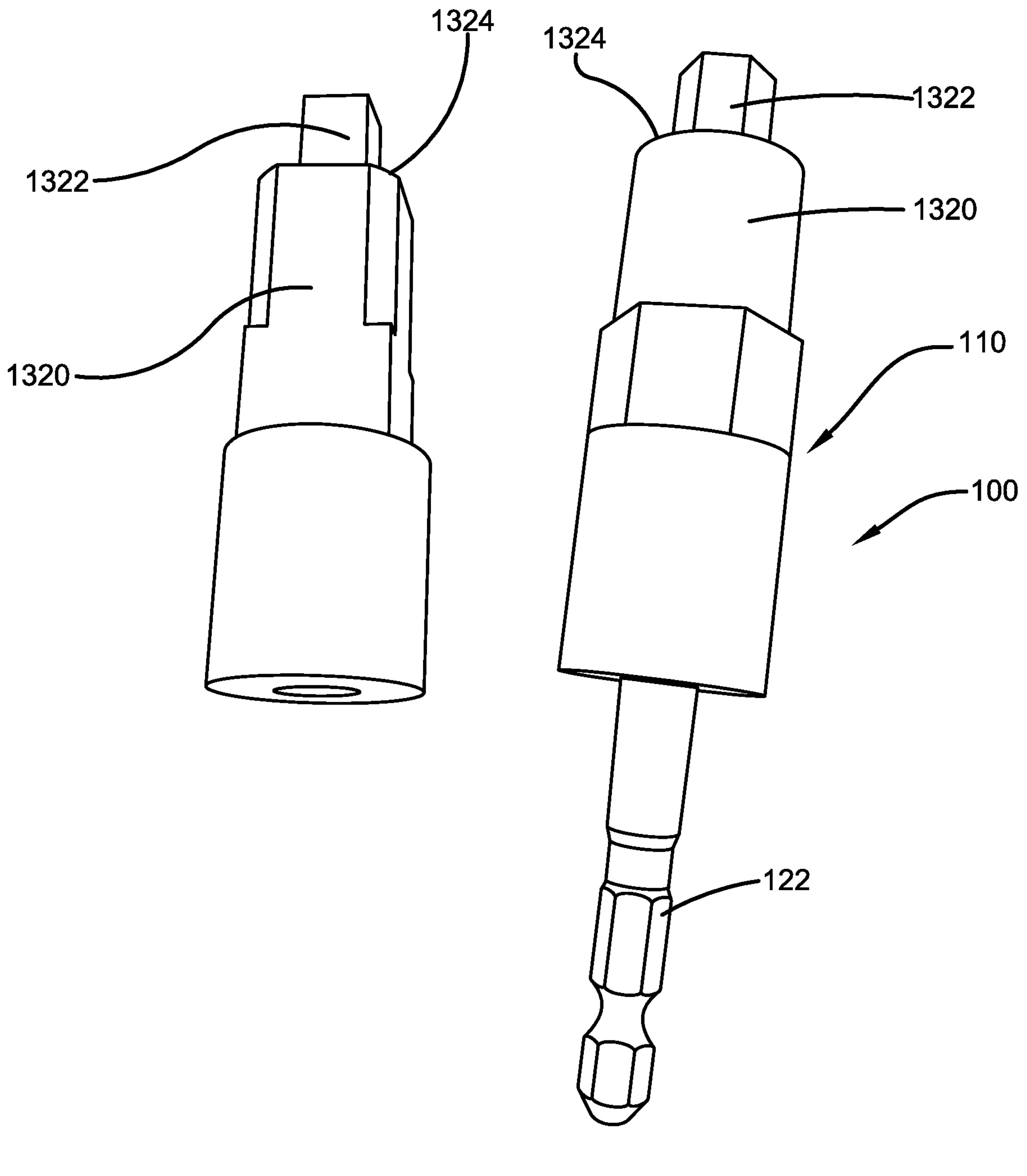
FIG. 5 illustrates a perspective view of two potential embodiments of an attachment or accessory to use for valve seat removal with an impact driver of the present invention in accordance with the disclosed architecture.

FIG. 5 illustrates a perspective view of two potential embodiments of an attachment or accessory to use for valve seat removal with an impact driver 100 of the present invention in accordance with the disclosed architecture. In one embodiment, the second end 130 has two heads 1320, 1322. The first head 1320 is located on the body 110. The first head 1320 is preferably a large seat wrench bit that is designed for a hot seat in a valve. The second head 1322 is located on the top surface 1324 of the first head 1320. The second head 1322 is of a smaller size and diameter than the first head 1320. The second head 1322 is preferably a seat wrench bit designed for a cold seat in a valve. Because the second head 1322 is smaller in size than the first head 1320, it does not inhibit the function of the first head 1320 during use. Similarly, because the second head 1322 is smaller than the first head 1320, the first head 1320 will not contact a cold seat when the small head 1322 is in use since the second head 1322 must engage the cold seat valve first. In this manner, this embodiment effectively allows two different valve wrench bits to be used on one device 100.

As also shown in FIG. 1, the center body portion 140 may have at least one LED 144 located on the outer surface 142. The LED 144 allows the second end 130 to be illuminated, such that a user can better observe the valve seat 12 during use of the tool or attachment 100. In one embodiment, the at least one LED 144 may be located on the front surface 134 of the head 132, or any other surface of the head 132 and/or body 110. The LED 144 is further powered by a battery 146. The battery 146 may be a disposable battery or a rechargeable battery in the form of an alkaline, nickel-cadmium, nickel-metal hydride battery, etc., such as any 3V-12 volts DC battery or other conventional battery such as A, AA, AAA, etc., that supplies power to the device 100. Throughout this specification the term “battery” may be used interchangeably to refer to one or more wet or dry cells or batteries of cells in which chemical energy is converted into electricity and used as a source of DC power. References to recharging or replacing the battery 100 may refer to recharging or replacing individual cells, individual batteries of cells or a package of multiple battery cells as is appropriate for any given battery technology that may be used. In addition, a rechargeable embodiment of the battery 146 may be recharged using a USB port 145, wherein the USB port 145 is a USB-A, USB-B, Micro-B, Micro-USB, Mini-USB, or USB-C port.

To use the device 100, a user loosens the chuck 11 of the impact driver 10 and/or drill, places the shaft 122 into the chuck 11 and then tightens the chuck 11. A user can then place the head 132 into a valve seat 12 and power the impact driver 10 to spin the head 132 to unthread or thread the valve seat 12 from a valve housing 20 (that, in differing embodiments, may have a structure present on a faucet, shower, bathtub, spigot, etc.). As a result, a user can easily remove the valve seat 12 without significant physical exertion and effort or without destroying or damaging the surrounding fittings or walls where the valve seat may be located.

Other variations of the tool end of the device 100 may be used to extract similar specific and recessed seat-like components for a wide variation of applications found in the plumbing, carpentry, electrical, HVAC, automotive and other mechanical fields, and applications thereof. Further, the extraction of any flush or recessed component, that would otherwise be accomplished with difficulty by hand, can be accomplished with the device 100 of the present invention with a specific variation designed for the part as needed. For example, the device can be constructed like a socket and be capable of being plugged into a ratchet or ⅜" bit with ratchet and that receives the socket seat tool. The sockets, being the seat tools themselves with a square female receiver at the base and able to be plugged into the male shaft of an impact, drill, screwdriver handle or any other receiver, are able to be used with a standard socket set.

Furthermore, one bit can have multiple size wrenches formed on it, thereby allowing a user to remove the two Carmen seats found in one valve when doing a repair, replacement or rebuild. More specifically, both the hot and cold seats can be removed with this one bit/seat wrench, thereby allowing the user to avoid having to change the bit when working on one valve while replacing both the hot and cold seats. Historically, different plumbing valves, faucets or fixtures required two specific sizes which in turn required a user to purchase, transport, store and use a various assortment of multi tool wrenches for each specific valve. The zips seat extractor multi tool seat wrench remover of the present invention can have an assortment of different size bits with an array of different combinations as needed for removing specific multiple items without the need to change the bit. Further the concepts of the present invention could also apply to other recessed removal tools that require the same kind of action or movement such as in the automotive, marine or military fields, or any other mechanical application. Additionally, it is worth noting that the first part may be a speed bit that is able to plug into a receiver chuck, such as the type commonly found on impact guns and that are used to break free the seized seats or other recessed components.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein “valve seat removal impact driver attachment device” and “device” are interchangeable and refer to the valve seat removal impact driver attachment device 100 of the present invention.

Notwithstanding the foregoing, the valve seat removal impact driver attachment device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the valve seat removal impact driver attachment device 100 as shown in the FIGS. are for illustrative purposes only, and that many other sizes and shapes of the valve seat removal impact driver attachment device 100 are well within the scope of the present disclosure. Although the dimensions of the valve seat removal impact driver attachment device 100 are important design parameters for user convenience, the valve seat removal impact driver attachment device 100 may be of any size, shape and/or configuration that ensures optimal performance during use and/or that suits the user’s needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A tool for removing a valve seat, the tool comprising:

a body having a first end, a second end and a central body portion disposed between the first and second ends;

wherein the first end is comprised of an engagement head and a recess positioned adjacent to the engagement head; and wherein the second end comprises a first head that is sized and configured to fit within a first valve seat and a second head positioned on a top surface of the first head that is sized and configured to fit within a second valve seat; and wherein the second end further comprises a deformable element for securing the second end into the first valve seat or the second valve seat.

2. The tool for removing a valve seat as recited in claim 1, wherein the second end comprises an insertion gauge.

3. The tool for removing a valve seat as recited in claim 1 further comprising an LED light.

4. The tool for removing a valve seat as recited in claim 3, wherein the first head has a diameter larger than a diameter of the second head.

5. The tool for removing a valve seat as recited in claim 1, wherein the recess is between the engagement head and a body portion of the first end.

6. The tool for removing a valve seat as recited in claim 1, wherein the first end comprises a diameter that is less than a diameter of the second end.

7. The tool for removing a valve seat as recited in claim 6, wherein the diameter of the first end is approximately half the diameter of the second end.

8. The tool for removing a valve seat as recited in claim 6, wherein the diameter of the first end is approximately one third of the diameter of the second end.

9. The tool for removing a valve seat as recited in claim 1, wherein the engagement head is configured to be received by a chuck of a drill or a driver.

10. An impact drill system comprising:

an impact drill comprised of an adjustable chuck;

an accessory for the impact drill, wherein the accessory is used for removing a valve seat;

wherein the accessory is comprised of a first end with an engagement head, and the engagement head is configured to fit within the adjustable chuck;

wherein the accessory is comprised of a second end having a first head and a second head;

wherein a diameter of the first head is smaller than a diameter of the second end; and wherein the first and second ends are disposed on opposite ends of a shaft; and wherein the second end further comprises a plurality of deformable elements to secure the second end within the valve seat.

11. The impact drill system as recited in claim 10, wherein the first end is comprised of a recess positioned adjacent to the engagement head.

12. The impact drill system as recited in claim 11, wherein the first end is comprised of a body portion adjacent to the recess and on an opposite side of the engagement head.

13. The impact drill system as recited in claim 10, wherein the second end comprises a LED light disposed on a body of the second end.

14. The impact drill system as recited in claim 10, wherein the body comprises a recess to receive the shaft.

15. The impact drill system as recited in claim 13, wherein the second end further comprises a gauge to determine a depth of insertion of the second end within the valve seat.

16. The impact drill system as recited in claim 10, wherein the engagement head is shaped like one of a hex socket, an impact socket, a square socket, a double square socket, a penta socket, a spine socket, a Phillips socket or a slotted socket.

17. An impact drill and tool combination comprising:

an impact drill having an adjustable chuck; and a tool having a first end for insertion into the adjustable chuck and a second end comprised of a first head for insertion into a first valve seat and a second head for insertion into a second valve seat, wherein the first end comprises of a shaft and the second end is connected to a body having an internal channel, wherein the shaft is sized and configured to fit within the internal channel of the body, and wherein the second end further comprises a plurality of deformable elements to secure the second end within the second valve seat.

18. The impact drill and tool combination as recited in claim 17, wherein the shaft is magnetic and is removably held within the channel.

* * * * *